(12) United States Patent
Silveri et al.

(10) Patent No.: US 7,806,802 B2
(45) Date of Patent: Oct. 5, 2010

(54) PREVENTING ROLLBACK OF A HYBRID ELECTRIC VEHICLE

(75) Inventors: Andrew J. Silveri, Royal Oak, MI (US); Ihab S. Soliman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 682 days.

(21) Appl. No.: 11/846,096

(22) Filed: Aug. 28, 2007

(65) Prior Publication Data
US 2009/0062061 A1 Mar. 5, 2009

(51) Int. Cl.
*B60W 10/04* (2006.01)
*B60W 10/02* (2006.01)

(52) U.S. Cl. .............................. 477/5; 477/180; 477/901

(58) Field of Classification Search .................. 477/901
See application file for complete search history.

(56) References Cited

U.S. PATENT DOCUMENTS 7,032,697 B2 * 4/2006 Lee .......................... 180/65.25
2004/0067818 A1 * 4/2004 Obermeier-Hartmann et al. .......................... 477/170

* cited by examiner

*Primary Examiner*—Sherry L Estremsky
*Assistant Examiner*—Edwin A. Young
(74) *Attorney, Agent, or Firm*—David B. Kelley; MacMillan, Sobanski & Todd, LLC

(57) ABSTRACT

In a vehicle powertrain that includes an engine and an electric machine, a method for preventing rollback of a wheeled vehicle located on an incline includes determining a magnitude of wheel torque required to prevent the vehicle from rolling back, using the electric machine to produce the required magnitude of wheel torque at the wheels, transmitting engine torque to the wheels, and reducing torque produced by the electric machine while increasing engine torque such that the sum of wheel torque produced by the engine and electric machine is substantially equal to said required magnitude of wheel torque.

16 Claims, 7 Drawing Sheets

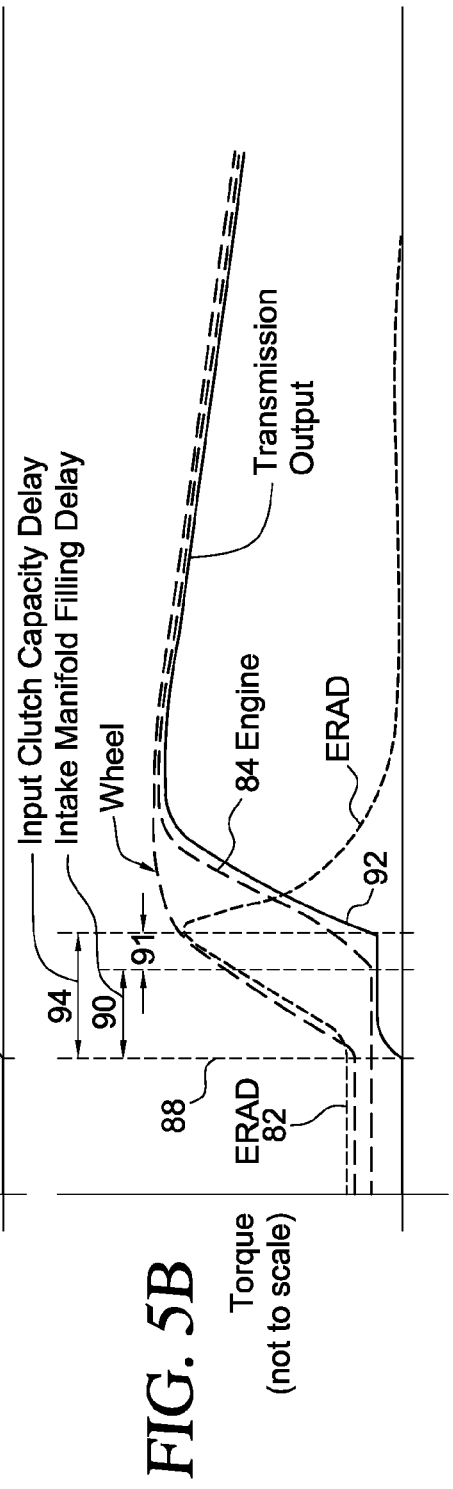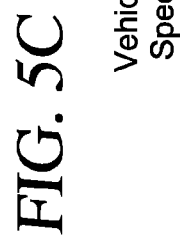

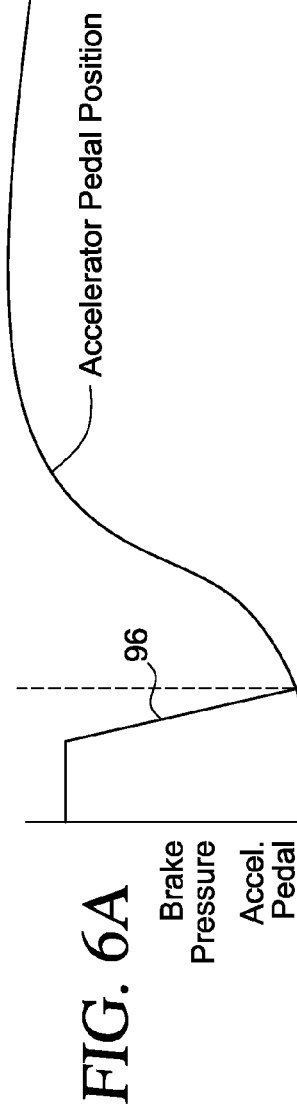
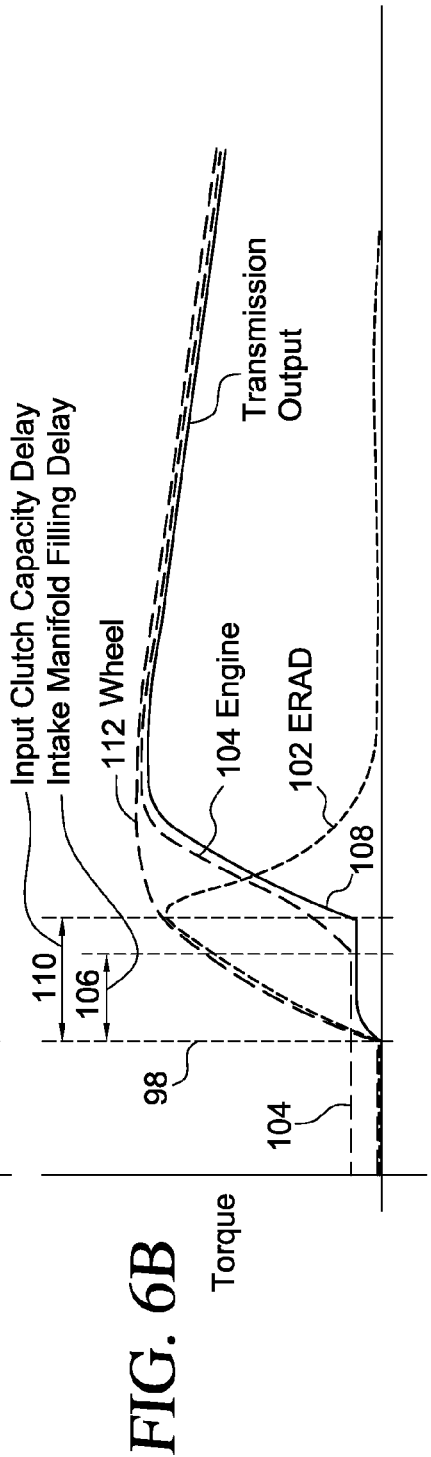
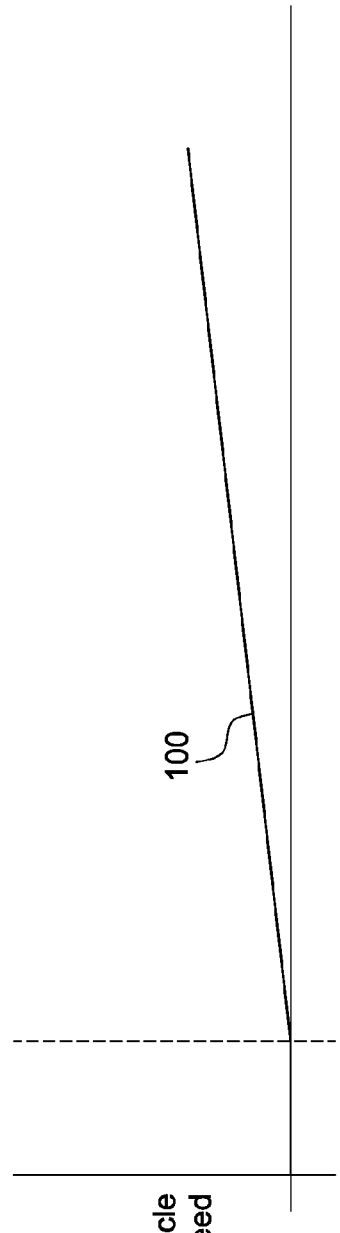
FIG. 6A
FIG. 6B
FIG. 6C

PREVENTING ROLLBACK OF A HYBRID ELECTRIC VEHICLE

BACKGROUND OF THE INVENTION

1. Field of the Invention

This invention relates generally to a powertrain for a hybrid electric vehicle (HEV) having an engine, an electric machine and a multiple-speed, powershift transmission. In particular, the invention pertains to using the powertrain to prevent rollback of the vehicle on an incline.

2. Description of the Prior Art

A powershift transmission is an example of a power transmission for a motor vehicle in which there is no torque-converter. A powershift transmission is a geared mechanism producing multiple gear ratios in forward drive and reverse drive and having two input clutches, which connect a power source, such as an engine or electric motor, to two transmission shafts. A powershift transmission transmits power alternately to the two shafts using synchronized clutch-to-clutch shifts.

A powershift transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

Conventional vehicles with automatic transmissions have torque converters that allow the transmission to stay in gear even when the vehicle is stopped or launching on an incline. In a vehicle having a converterless transmission, such as a powershift or manual transmission, the clutches must be slipping or disengaged when the vehicle is stopped or launching on an incline to avoid vehicle stall; therefore the transmission cannot transmit torque to the wheels immediately.

When a vehicle without a torque converter transitions from being stopped on a positive incline to ascending the incline, delays in torque delivered to the wheels necessary to accelerate the vehicle can result in undesirable rollback of the vehicle. Rollback control is required when the driver depresses the accelerator pedal, called a "tip in," and expects to ascend the hill. If the engine is to provide torque to the wheels to launch the vehicle, a delay occurs before torque is transmitted to the wheels due to delay in charging the intake manifold and engine cylinders with a combustible fuel/air mixture and delay in producing transmission input clutch torque capacity.

When a HEV stops on a positive grade, the engine is typically shut off to save fuel, but certain conditions may require the engine to continue running including charging the battery, a driver's request for front accessory drive for air conditioning, or a request for other belt driven electro-mechanical devices. Vehicle rollback of an HEV with the engine running can occur in the transition from holding the vehicle on the positive grade to accelerating the vehicle up the grade. The HEV vehicle can be held stationary on a positive incline when the driver applies the wheel brakes, or, if the brakes are released, when an electric machine provides holding torque while the engine is idling. In a HEV, the transmission can be placed in neutral and an electric machine operating as a motor may be used to hold the vehicle stationary on an incline.

There is a need in the industry for a technique that eliminates unintended rollback due to delay in torque delivery to the wheels of a vehicle when the vehicle operator tips-in to accelerate the vehicle on an uphill grade from a stationary vehicle condition while the engine is running.

SUMMARY OF THE INVENTION

In a vehicle powertrain that includes an engine and an electric machine, a method for preventing rollback of a wheeled vehicle located on an incline includes determining a magnitude of wheel torque required to prevent the vehicle from rolling back, using the electric machine to produce the required magnitude of wheel torque at the wheels, transmitting engine torque to the wheels, and reducing torque produced by the electric machine while increasing engine torque such that the sum of wheel torque produced by the engine and electric machine is substantially equal to said required magnitude of wheel torque.

An electric machine (ERAD) prevents rollback prevention of a vehicle as the driver tips into the accelerator pedal. The ERAD quickly provides torque that is transmitted to the wheels to avoid rollback. The ERAD torque is necessary to provide torque to the wheels during delays caused by engine manifold filling and the transmission engagement. If the state of charge of the battery is below a reference state of charge or ERAD temperature is greater than a thermal limit, the ERAD torque capability will be reduced which requires the engine output torque to be blended with that of the ERAD.

Finally, ERAD torque is blended off synchronously while engine torque increases, thereby maintaining a constant wheel torque. This provides an undetected transition as the engine is used for vehicle propulsion while preventing vehicle rollback The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIGS. 5A-5C show the variation over time of powertrain variables while vehicle rollback is controlled in response to a tip-in; and FIGS. 6A-6C show the variation over time of powertrain parameters while vehicle rollback is being controlled in response to releasing the wheel brake pedal.

DESCRIPTION OF THE PREFERRED EMBODIMENT

Figure 1:
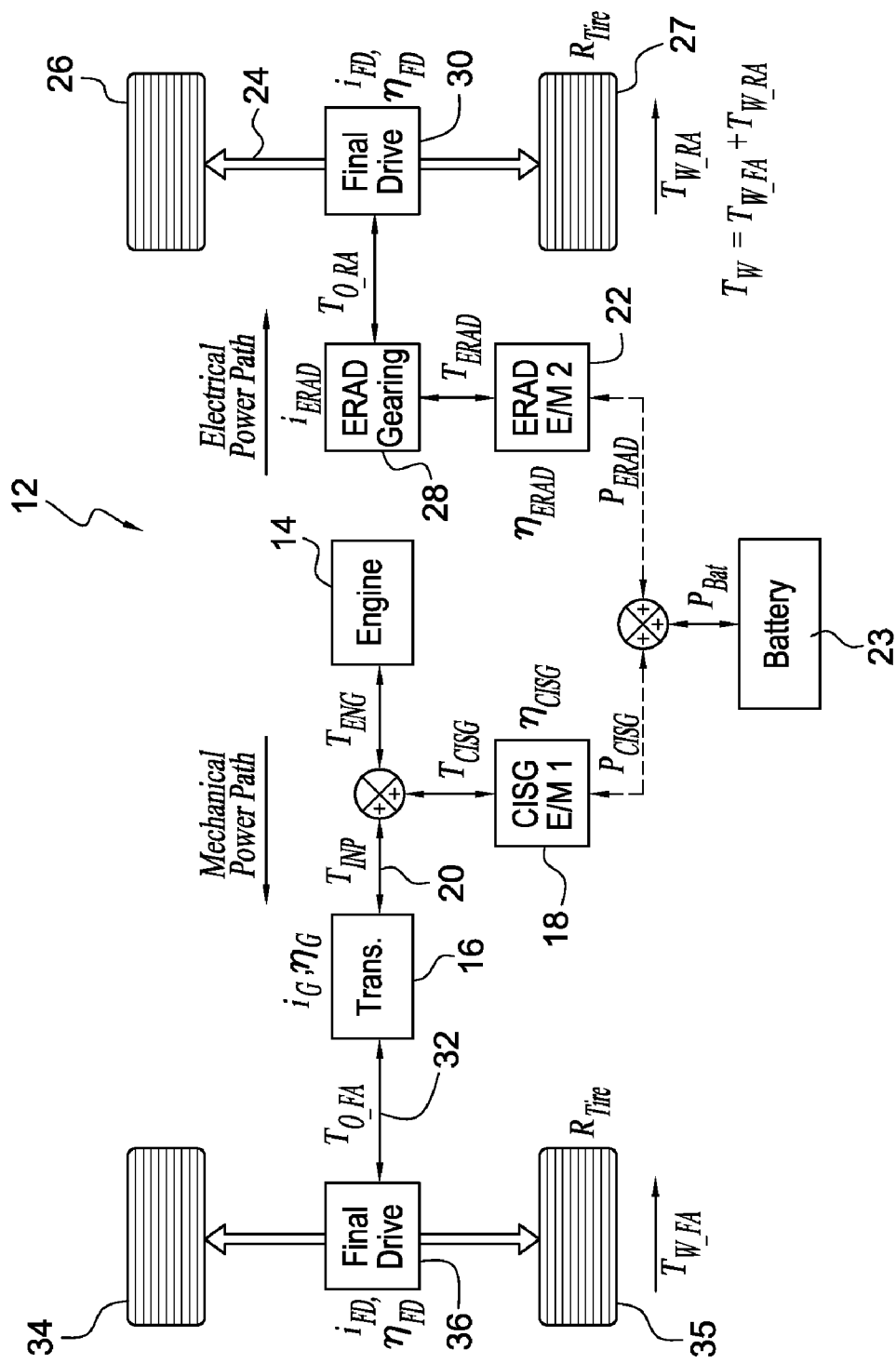
FIG. 1 is a schematic diagram of a vehicle powertrain system to which rollback control can be applied.
Figure 2:
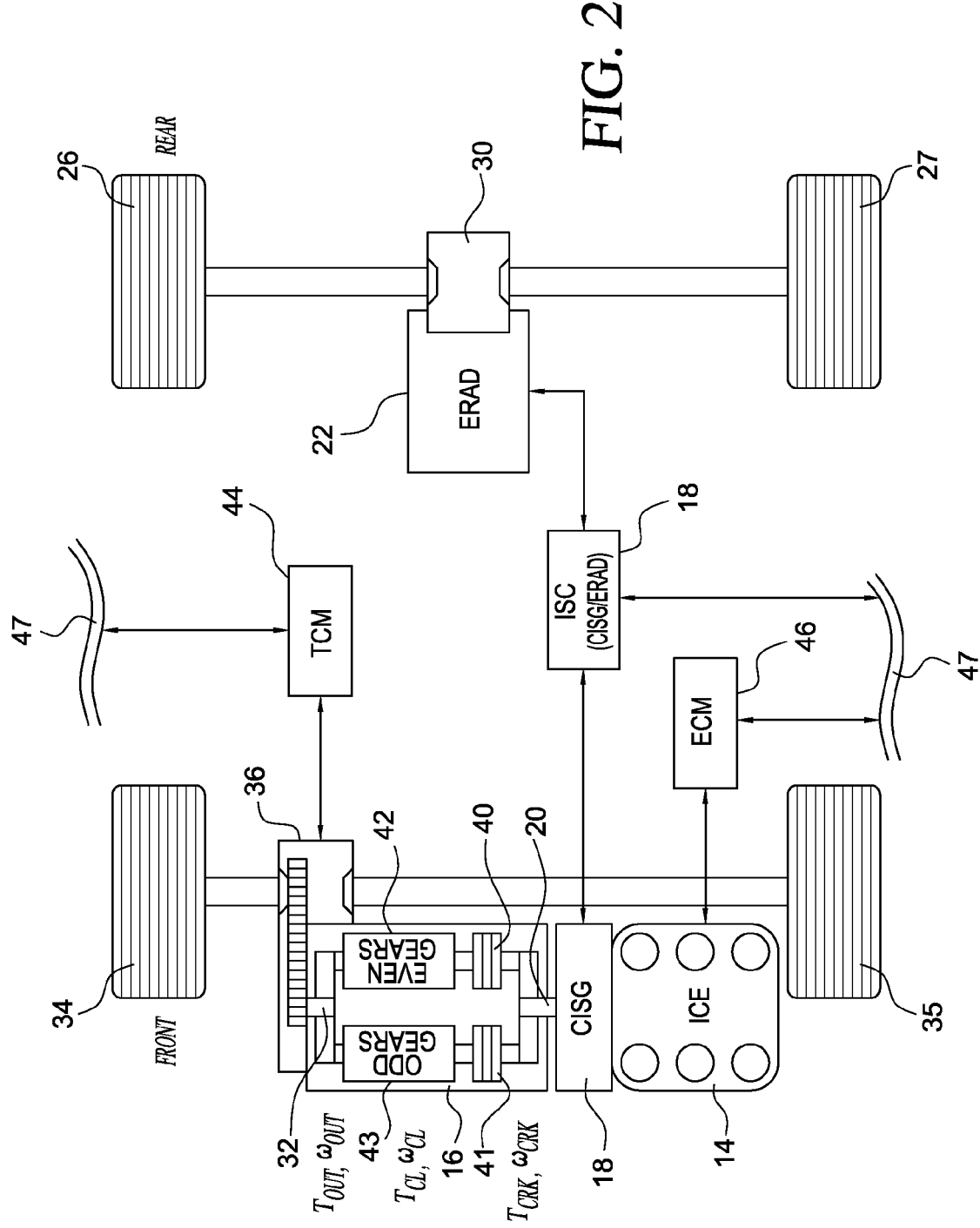
FIG. 2 is a schematic diagram showing additional details of the vehicle powertrain system of FIG. 1.

As shown in FIGS. 1 and 2, a vehicle powertrain 12 includes an engine 14, such as a diesel or gasoline engine; a transmission 16, such as dual wet clutch powershift transmission or another multiple ratio transmission having no torque converter; an electric machine 18, such as an CISG driveably connected to the transmission input 20; and an additional electric machine 22, such as an electric motor. Electric machine 18 provides rotating power to crank engine 14 when starting the engine and generates electric power, which is supplied directly to machine 22, or to an electric storage battery 23 or to both of these.

Electric machine 22, sometimes referred to as an electric rear axle drive unit (ERAD), is connected to the final drive of a rear axle 24 and provides propulsion capability in either an electric drive or hybrid (series/parallel) drive mode. Power output by the electric machine 22 drives vehicle wheels 26, 27 through ERAD gearing 28 and a final drive unit 30, which is in the form of an inter-wheel differential mechanism. Similarly, the transmission output 32 is driveably (mechanically) connected to vehicle wheels 34, 35 through a final drive unit 36, which includes an inter-wheel differential mechanism. In front wheel drive (FWD) applications, electric machine 22 could be driveably connected to the final drive 36 of the front axle at the output 32 of the transmission 16, in which case it is referred to as an electric front axle drive (EFAD) unit.

FIG. 2 illustrates the input clutches 40, 41, which selective connect the input shaft 20 of transmission 16 alternately to the even-numbered gears 42 and odd-numbered gears 43; an electronic transmission control module (TCM) 44, which controls the input clutches and gearbox state through command signals to servos or solenoids that actuate the input clutches and gearbox shift forks/synchronizers; an electronic engine control module (ECM) 46, which controls operation of engine 14; and an ISC 48, which controls the CISG and ERAD operations. A vehicle control system (VCS), which is not shown, issues control commands to the TCM and ECM. Each of the VCS, TCM and ECM includes a microprocessor accessible to electronic memory and containing control algorithms expressed in computer code, which are executed repeatedly at frequent intervals. Data communication among the control modules, ECM 46, VSC, TCM 44 and ISC 48 is carried on a communications bus 47.

Powertrain 12 includes two power paths to the load, a mechanical path and an electrical path. Power produced by engine 14 is transmitted through transmission 16 and final drive 36 in the mechanical power path to wheels 34, 35. Power produced by ERAD 22 is transmitted through ERAD gearing 28 and final drive 30 in the electrical propulsion path to wheels 26, 27.

Figure 3:
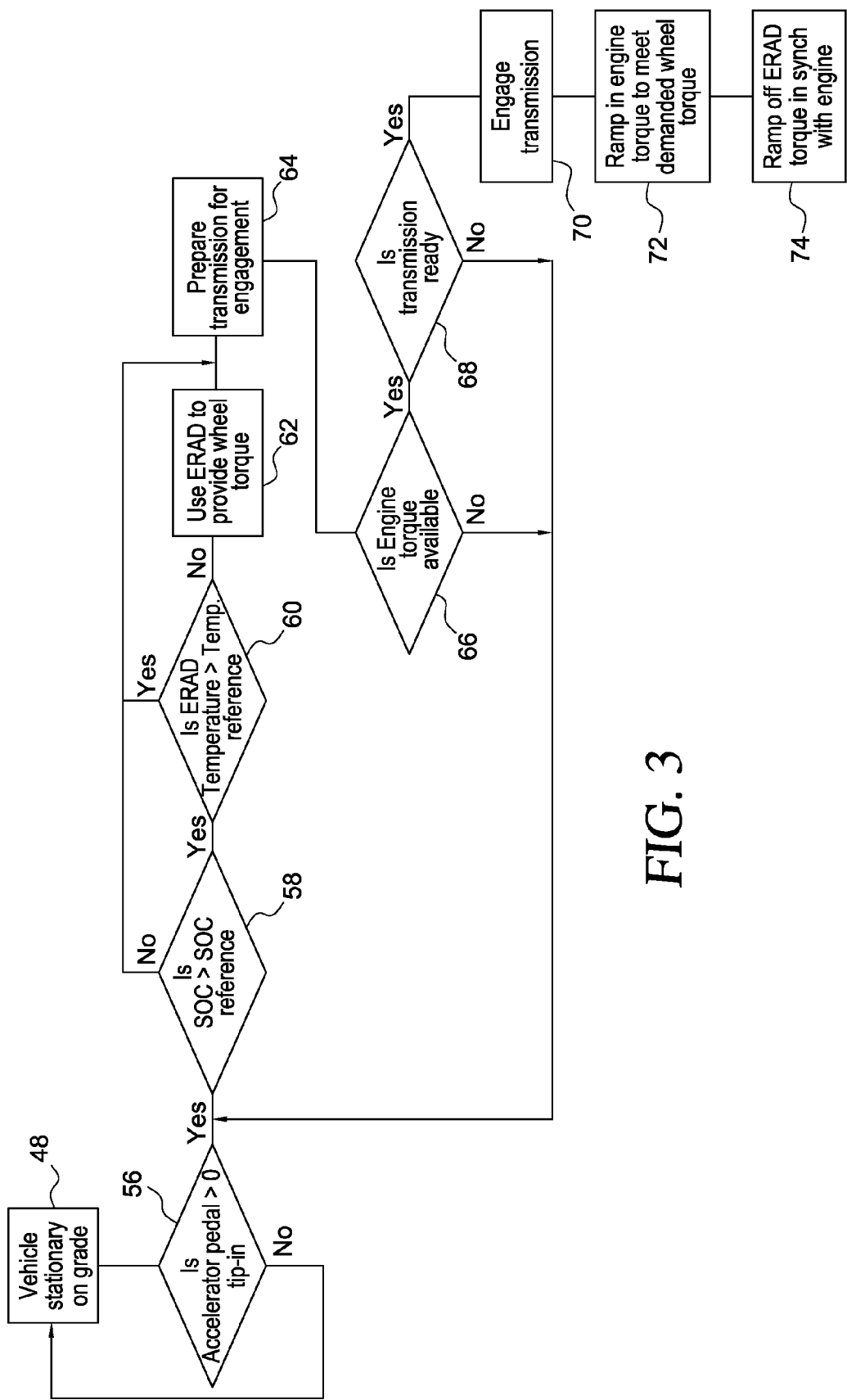
FIG. 3 illustrates the steps of a control method for preventing vehicle rollback.

FIG. 3 illustrates the steps of control algorithm for preventing vehicle rollback. As shown in FIGS. 5A-5C, the hill hold control strategy uses ERAD 22 to provide torque to accelerate the vehicle on a hill in order to prevent rollback during a period required before the engine produces output torque and the transmission transmits engine output torque to the wheels. When a tip-in occurs, the ERAD can quickly provide torque to the wheels and accelerate the vehicle to avoid rollback because the ERAD produces output torque quickly.

Figure 4:
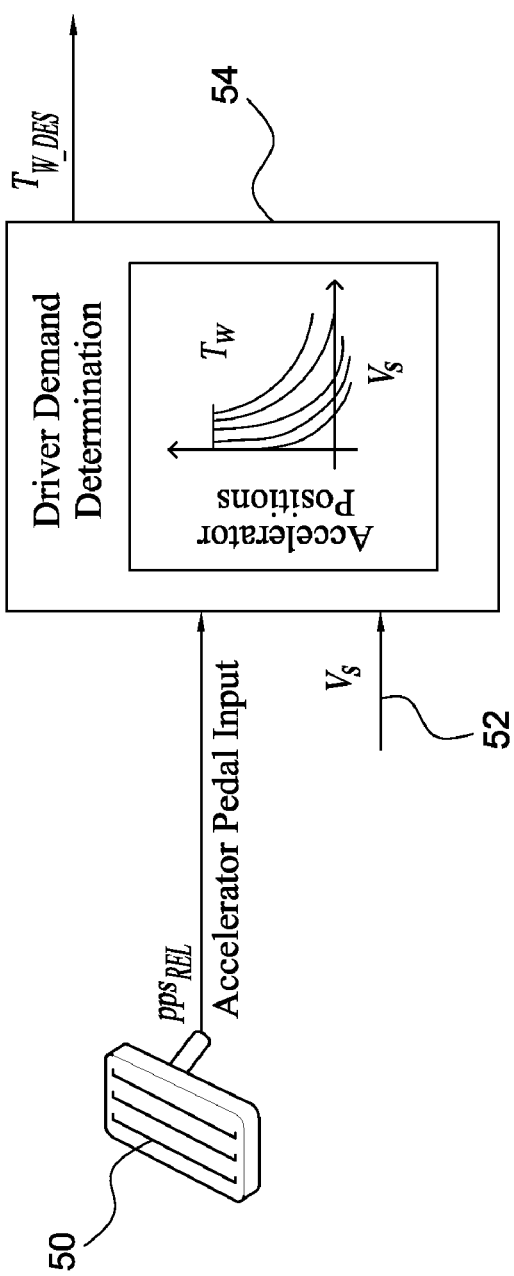
FIG. 4 is a schematic diagram showing a function for determining required wheel torque.

The control algorithm is called for execution by the controller at step 48 when signals produced by sensors indicate that the vehicle is stopped on an incline. As FIG. 4 shows, the vehicle operator's demand for wheel torque is represented by the degree to which the engine accelerator pedal 50 is depressed, which depression is usually referred to as accelerator pedal position, pps. An electronic signal representing the accelerator pedal position produced by a pps sensor and an electronic signal representing the current vehicle speed (VS) 52 produced by a shaft speed sensor, are received as input by a driver demand determination function 54, accessible in electronic memory, the function being indexed by the two input variables VS and pps and producing as its output the current desired wheel torque $T_{W\_DES}$.

At step 56, a test is made to determine whether the accelerator pedal position is greater than zero or a reference pedal position. If the result of test 56 is logically true, control passes to step 58. If the result of test 56 is false, control returns to 48.

At step 58, a test is made to determine whether the battery's state of charge (SOC) is greater than a reference SOC. If the result of test 58 is true, control passes to 60, where a test is made to determine whether the temperature of ERAD 22 is greater than a reference temperature. If the result of test 60 is false, control passes to step 62, where ERAD 22 produces torque, which is transmitted to the wheels to control rollback of the vehicle on the incline.

Provided the accelerator pedal is depressed, the battery's SOC is above the reference SOC, and the ERAD temperature is below the reference temperature, ERAD 22 and the electric power path are used at step 62 to drive the wheel load and control vehicle rollback. If the result of test 58 is false and test 60 is true, ERAD is not currently available to provide torque to the wheels and prevent rollback. Next, control advances to step 64, where the appropriate input clutch of transmission 16 associated with the current gear command (the subject clutch 40, 41) is commanded to stroked pressure in preparation for engagement. Steps 64 through 72 apply to conventional vehicles as well as hybrid vehicles.

At step 66 a test is made to determine whether engine 14 is currently producing the demanded wheel torque. If the result of test 66 is true, a check is made at step 68 to determine whether the selected gear is engaged and the subject clutch 40, 41 of transmission 16 is prepared for engagement. If the result of either of tests 66, 68 is false, control returns to step 58.

If the result of tests 66 and 68 is true, the subject input clutch 40, 41 is engaged at step 70, engine torque is increased such the wheel torque reaches the demanded wheel torque at step 72, and ERAD torque is decreased at step 74 along a descending ramp concurrently with the increase in engine torque, as shown in FIG. 5B.

FIGS. 5A-5C, represent the variation of various vehicle and powertrain variables during a period when vehicle rollback is controlled with the HEV stopped on an incline, having a positive slope, in response to tip-in and while the wheel brakes are released.

As FIGS. 5A and 5C show, the accelerator pedal position 80 increases following a period 76, during which torque produced by ERAD 22 and transmitted to wheels 26, 27 is used to hold the HEV on the incline, the accelerator pedal 50 is off (not pressed), and vehicle speed 78 is zero. The accelerator pedal position 80 increases as the operator demands wheel torque to move the vehicle forward on the incline. Accelerator pedal position 80 later decreases slightly and remains steady while the vehicle speed 78 increases steadily.

In FIG. 5B, following period 76, ERAD torque 82 increases rapidly in response to the increase in accelerator pedal position 80, reaches a peak, and is ramped off synchronously with the increases in engine torque and transmission output torque, thereby maintaining wheel torque without transient impulses. This provides an undetected transition as the engine is used for vehicle propulsion while preventing vehicle rollback. Engine torque 84 is at engine idle setpoint during period 76 before the rollback prevention control begins at 88, remains low during a delay period 90 while the intake manifold and engine cylinders are filled with a combustible air-fuel mixture as a result of the tip-in, and increases rapidly after the engine is charged. Transmission output torque 92 is low during period 76, remains constant during a delay period 94 while the torque capacity of the subject input clutch 40, 41 increases, and increases rapidly with engine torque. Wheel torque increases from holding level during period 76 to the new driver demanded level when accelerator pedal 50 is depressed at the beginning of the rollback prevention control 88.

FIGS. 6A-6C shows the variation of powertrain parameters with the HEV under vehicle rollback control in response to the vehicle operator releasing a wheel brake pedal. As FIGS. 6A and 6C show, the wheel brake pedal position or brake pressure 96 decreases rapidly to zero after being released, the operator tips-in to the accelerator pedal at 98, and vehicle speed 100 increases steadily thereafter.

In FIG. 6B, following the beginning of rollback control at 98, ERAD torque 102 increases rapidly in response to the increase driver demanded torque as indicated by the increase in accelerator pedal position, reaches a peak, and decreases to zero while engine torque 104 increases. Engine torque 104 is at engine idle level before the rollback prevention control begins at 98, remains low during a delay period 106 while the intake manifold and engine cylinders are filled with a combustible air-fuel mixture, and increases rapidly after the engine is charged. Transmission output torque 108 is low initially, remains constant during a delay period 110 while the torque capacity of the subject input clutch 40, 41 increases, and increases rapidly with engine torque. Wheel torque 112 increases rapidly when accelerator pedal 50 is depressed at the beginning of the hill-hold control 98.

Figure 7:
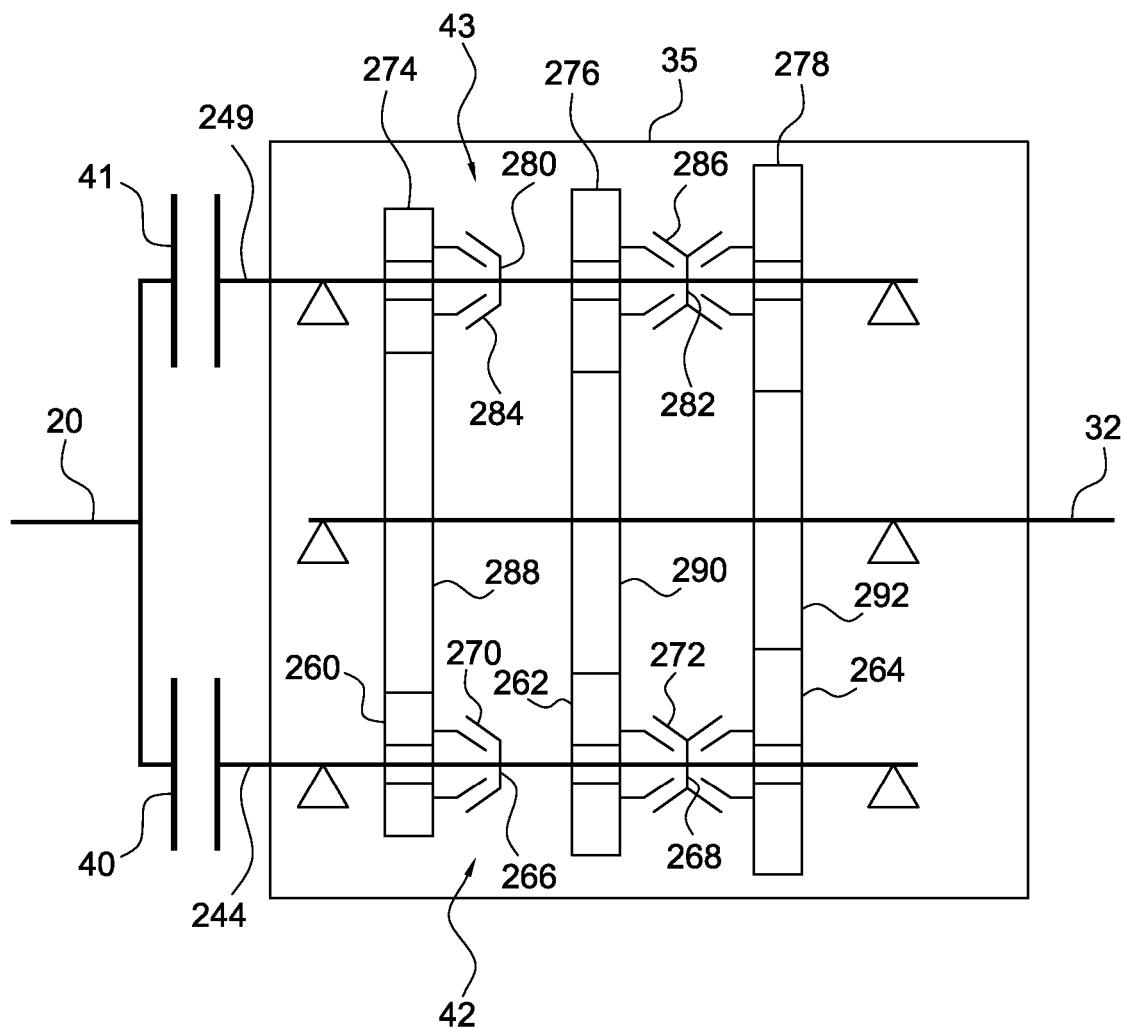
FIG. 7 is a schematic diagram of a kinematic arrangement for a powershift transmission.

FIG. 7 illustrates details of a powershift transmission 16 including a first input clutch 40, which selective connects the input 20 of transmission 16 alternately to the even-numbered gears 42 associated with a first layshaft 244, and a second input clutch 41, which selective connects the input 20 alternately to the odd-numbered gears 43 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 32 supports gears 288, 290, 292, which are each secured to shaft 32. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

Although the invention has been described with reference to a powershift transmission, the invention is applicable to any automatic shift manual transmission, or automatic transmission that has no torque converter located in a power path between the engine and transmission input.

In accordance with the provisions of the patent statutes, the preferred embodiment has been described. However, it should be noted that the alternate embodiments can be practiced otherwise than as specifically illustrated and described.

What is claimed is:

1. In a vehicle powertrain that includes an engine and an electric machine, a method for preventing rollback of a wheeled vehicle located on an incline, comprising the steps of:
    (a) determining a magnitude of wheel torque required to prevent the vehicle from rolling back;
    (b) using the electric machine to produce the required magnitude of wheel torque at the wheels;
    (c) transmitting engine torque to the wheels; and
    (d) reducing torque produced by the electric machine while increasing engine torque such that the sum of wheel torque produced by the engine and electric machine is substantially equal to said required magnitude of wheel torque.

2. The method of claim 1 wherein step (a) further includes the step of using a speed of the vehicle and a position of an accelerator pedal to determine the required wheel torque.

3. The method of claim 1 further including the step of determining that a position of an accelerator pedal is greater than a reference pedal position.

4. The method of claim 1, wherein the vehicle further includes an electric storage battery for supplying electric power to the electric machine, further comprising the steps of:
    determining whether a state of charge of the battery is greater than a reference state of charge;
    if the state of charge of the battery is greater than the reference state of charge, using the electric machine to produce the required wheel torque; and
    if the state of charge of the battery is less than the reference state of charge, using the engine to produce the required wheel torque.

5. The method of claim 1, further comprising the steps of:
    determining whether a temperature of the electric machine is greater than a reference temperature;
    if the state of charge of the battery is less than the reference temperature, using the electric machine to produce the required wheel torque; and
    if the state of charge of the battery is greater than the reference temperature, using the electric machine to produce the required wheel torque.

6. The method of claim 1, wherein the powertrain includes a transmission having multiple gears and an input clutch, and step (b) further comprises:
    engaging a selected gear of the transmission; and
    stroking the input clutch that driveably connects the engine to the wheels through the selected gear while the electric machine produces the required magnitude of wheel torque at the wheels.

7. The method of claim 1, wherein the powertrain includes a transmission having an input clutch, the method further comprising the step of:
    controlling the torque capacity of the input clutch and the magnitude of engine torque such that the engine does not stall.

8. The method of claim 1 wherein step (b) further comprises the step of charging an engine intake manifold and at least one engine cylinder with a fuel-air mixture while the electric machine produces the required magnitude of wheel torque at the wheels.

9. In a vehicle powertrain that includes an engine driveably connected to first wheels, a transmission, a transmission input clutch, and an electric machine driveably connected to second wheels, a method for preventing rollback of a wheeled vehicle located on an incline, comprising the steps of:
   (a) determining a magnitude of wheel torque required to prevent the vehicle from rolling back;
   (b) using the electric machine to produce said required magnitude of wheel torque at the second wheels while engaging a selected gear of the transmission and stroking the input clutch;
   (c) transmitting through the input clutch and the transmission to the first wheels torque produced by the engine; and
   (d) reducing torque produced by the electric machine while increasing engine torque such that the sum of wheel torque at the first wheels produced by the engine and wheel torque at the second wheels produced by the electric machine is substantially equal to said required magnitude of wheel torque.

10. The method of claim 9 wherein step (a) further includes the step of using a speed of the vehicle and a position of an accelerator pedal to determine the required wheel torque.

11. The method of claim 9, wherein the vehicle further includes an electric storage battery for supplying electric power to the electric machine, further comprising the steps of:
   determining whether a state of charge of the battery is greater than a reference state of charge;
   if the state of charge of the battery is greater than the reference state of charge, using the electric machine to produce the required wheel torque; and
   if the state of charge of the battery is less than the reference state of charge, using the engine to produce the required wheel torque.

12. The method of claim 9, further comprising the steps of:
   determining whether a temperature of the electric machine is greater than a reference temperature;
   if the state of charge of the battery is less than the reference temperature, using the electric machine to produce the required wheel torque; and
   if the state of charge of the battery is greater than the reference temperature, using the electric machine to produce the required wheel torque.

13. The method of claim 9 further comprising the step of:
   controlling the torque capacity of the input clutch and the magnitude of engine torque such that the engine does not stall.

14. The method of claim 9 wherein step (b) further comprises the step of charging an engine intake manifold and at least one engine cylinder with a fuel-air mixture while the electric machine produces the required magnitude of wheel torque at the second wheels.

15. In a vehicle powertrain that includes an engine, a transmission, a transmission input clutch, and a first electric machine coupled through the transmission to first wheels, and a second electric machine coupled to second wheels, a method for preventing rollback of a vehicle located on an incline, comprising the steps of:
   (a) determining a magnitude of wheel torque required to prevent the vehicle from rolling back;
   (b) using the second electric machine to produce wheel torque at the second wheels and the first electric machine to produce wheel torque at the first wheels while engaging a selected gear of the transmission and stroking the input clutch;
   (c) transmitting through the input clutch and the transmission to the first wheels torque produced by the engine; and
   (d) reducing the magnitudes of torque produced by the first and second electric machines while increasing engine torque such that the sum of wheel torque produced by the engine and the first and second electric machines is substantially equal to said required magnitude of wheel torque.

16. The method of claim 15 wherein step (b) further comprises using the first and second electric machines such that a sum of wheel torque produced by the first and second electric machines is substantially equal to said required magnitude of wheel torque.

* * * * *